April 21, 1931.   A. F. PORTER   1,802,269
VAPORIZER
Filed May 29, 1929
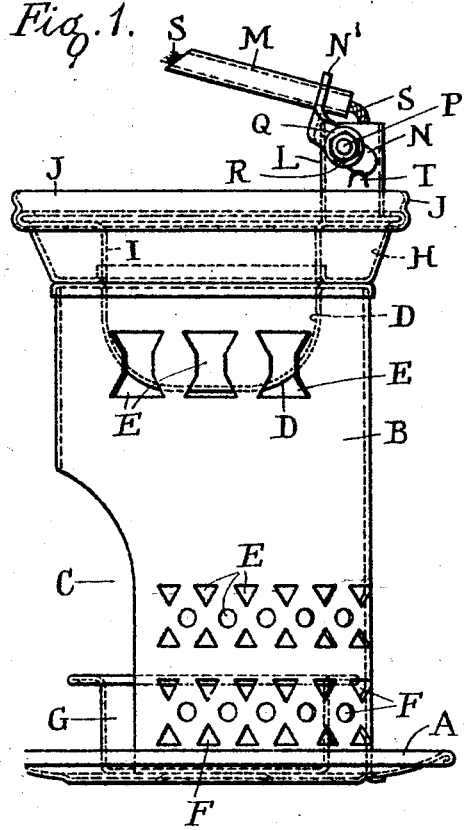
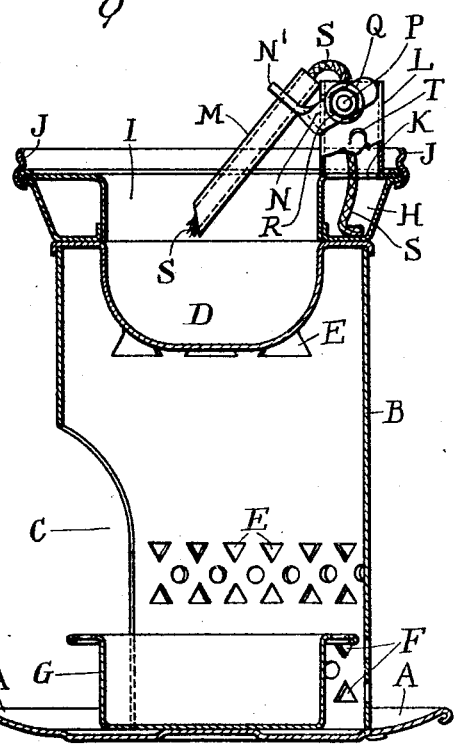
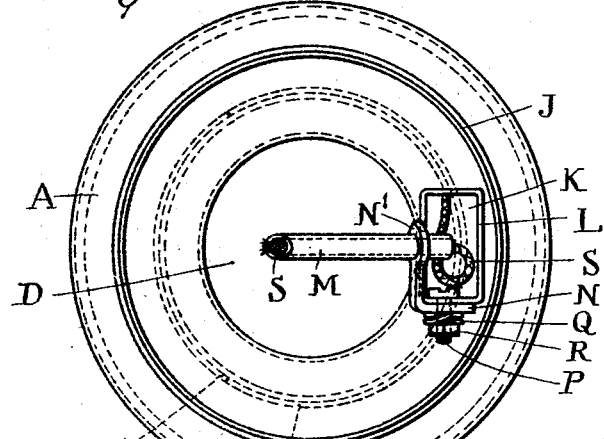
Inventor
Albert F. Porter
By
Attorney Patented Apr. 21, 1931

1,802,269

UNITED STATES PATENT OFFICE

ALBERT FRANK PORTER, OF LONDON, ENGLAND

VAPORIZER

Application filed May 29, 1929, Serial No. 367,071, and in Great Britain December 14, 1928.

This invention relates to that class of vaporizer in which liquid to be vaporized is fed in drops to a heated bowl, the drop delivering device comprising a tube positioned vertically within the liquid containing chamber which is open at the top, the tube projecting through the bottom of the chamber and carrying within it a wick or wicks which are led over the top of the tube into the chamber.

In such class of vaporizer it has been found that should the whole of the liquid not be vaporized and the heating medium be extinguished, the liquid will still drop into the heating bowl and, when the apparatus is moved, it is liable to be spilled from the bowl and flow over the vaporizer, rendering it in an unfit state for handling.

Also the vapour rising from the heated liquid condenses on the liquid containing chamber, rendering it unfit for handling. Further, after the last drop has fallen the remaining liquid collects at the end of the tube and dries up into a gumlike substance, which greatly hinders the starting of the dripfeed when the vaporizer is used the next time.

By this invention the disadvantages just mentioned are avoided by connecting the wick tube to the liquid containing chamber in such a manner, that when the heating medium is extinguished it can be so positioned that no more vaporizing liquid can be supplied to the bowl, and as the amount of feed is only in proportion to the vaporizing, any liquid remaining in the bowl will be vaporized by the remaining heat in the bowl and the bowl will thus be dried out so that the vaporizer can be freely handled without soiling the fingers.

Further, the timing of the drops of liquid into the heater bowl can be adjusted according to the length of time required by various makes of candles or heating mediums to supply sufficient heat to effect vaporization. The vapor readily escapes into the atmosphere since there is no overhanging chamber upon which it may condense.

According to my invention I pivot or otherwise connect or apply the wick tube to the liquid containing chamber or vessel or a wall thereof in such a manner that it can be positioned with its outlet extending downwardly or below the horizontal line of its pivot, connection or support, in order to supply the bowl with liquid, or can be positioned with its outlet above the horizontal line of the pivot, connection or support so as to stop the supply of liquid and return any surplus liquid from the tube to the liquid chamber, yet leaving the wick sufficiently impregnated by the liquid to start the capillary action when the tube is again positioned to supply liquid to the bowl.

The wick tube can be constructed in a variety of ways and be permanently or temporarily connected to the vaporizer and, if permanently connected to the vaporizer, may be acted upon by frictional means to hold it in adjusted position.

My invention will be clearly understood from the following description aided by the annexed drawings in which:—

Figure 1 is a side view of the apparatus, the wick tube being shown as lifted; Figure 2 a vertical sectional view, partly in elevation, the wick tube being shown as lowered, and Figure 3 is a top plan view.

The vaporizer to which my invention is shown as applied comprises a tray A on which is mounted a tubular body B having an opening C at the lower part thereof and a vaporizing bowl D mounted on its upper end, such bowl D depending into the body B. The body B is also provided with holes E for escape of products of combustion and with holes F for admission of air to support combustion of a heating medium, say a night light, positioned within the body B or contained within a tray G. The heating medium may be inserted through the opening C to rest on the tray A. On the upper end of the body B and above the bowl D is an annular chamber H having a central aperture I and provided with a depending flange about the same which coincides with the wall of bowl D. The top portion of the chamber H may either be flat or may slope towards the hole I and around such top portion is a wall J.

An aperture K, preferably of oblong shape in plan, is formed in the top of the chamber H and is surrounded by an upstanding wall or duct L. The wall L is cut away adjacent the aperture I of the chamber H.

The vaporizing liquid is poured into the chamber H through the aperture K and any overflow will pass through the cut away portion of the bowl L into the bowl D. A tube M of any desired diameter is supported adjacent one of its ends by the upstanding wall L about the aperture K in such manner that its outer end may be swung into or out of the bowl D. The means for so supporting the tube M comprises a bracket member N' which has one end bent into an arm N parallel with the tube M. Said arm N is secured against wall L by a bolt P which is encircled by a spring washer Q. A nut R threaded on to the stem of the bolt P holds the spring washer Q under compression to cause frictional contact between the arm N and the wall L so that the tube can be held in any position.

The tube M carries a wick S which extends into the wall L and the annular chamber H so that by capillary action the vaporizing liquid is carried from the annular chamber H to the bowl D in a manner well known.

The free end of the tube M is preferably angled and projects over the bowl D and such tube M can be positioned and by the frictional contact of the arm N with the wall L be held in any placed position. When the tube M is positioned as at Figure 1 the supply of vaporizing liquid is cut off and any liquid in the tube and the wick contained therein will flow back into the annular chamber H, but when the angled end is positioned as in Figure 2, the wick being always sufficiently impregnated will cause the vaporizing liquid by syphonic action, to flow and drip into the bowl D to be vaporized by the heat from the heating medium in the body B and by positioning the tube M at various angles with the angled end below the horizontal, the supply of vaporizing liquid is varied.

The tube M is limited in its upward movement by the end of the arm N abutting a stop T projecting from the wall L and in a downward direction by the arm N engaging the wall L.

What I do claim as my invention and desire to obtain by Letters Patent is:—

1. In a vaporizer, a vaporizing bowl, a chamber to contain liquid to be vaporized, a wick to supply the liquid from the chamber to said bowl, and means operable to adjust the discharge end of the wick to control the supply of liquid to said bowl.

2. In a vaporizer, a vaporizing bowl, a chamber to contain liquid to be vaporized, a wick to supply the liquid from the chamber to said bowl, means over which said wick passes adjustable so as to adjust the discharge end of the wick to control the supply of liquid and to drain into the bowl when the supply of liquid is cut off by such adjustment.

3. In a vaporizer, a vaporizing bowl, a chamber to contain the liquid to be vaporized, a wick to supply the liquid from the chamber to said bowl, a tube through which the wick passes, means mounting the tube for vertical adjustment at its discharge end and in relation to the chamber for drainage when the supply is cut off through adjustment.

4. In a vaporizer according to claim 3, friction means to secure the first mentioned means in its adjusted positions.

5. In a vaporizer according to claim 3, a duct communicating with said chamber, said tube being pivoted to said chamber.

6. In a vaporizer, a vaporizing bowl, a chamber to contain liquid to be vaporized, a duct extending from the chamber, a wick extending through the duct to supply the liquid from the chamber to said bowl, a tube through which the wick passes disposed over the bowl and pivoted to the duct, and a friction means whereby the tube will be held in different adjusted positions.

7. In a vaporizer, a supporting body provided with a bowl, a chamber member thereon to contain liquid to be vaporized, said member having a flange coinciding with the wall of the bowl, the top wall of the chamber member having an opening and a duct about the same, a tube adjustably mounted on said duct on a horizontal axis and over said bowl, and a wick passing through the duct and tube to supply fluid from the chamber to the bowl.

8. In a vaporizer according to claim 7, means to support a heating medium below the bowl, and means to secure the tube in different positions of adjustment.

In testimony whereof I have hereunto set my hand.

ALBERT FRANK PORTER.